(12) United States Patent
Terada et al.

(10) Patent No.: US 6,404,370 B2
(45) Date of Patent: Jun. 11, 2002

(54) SEMICONDUCTOR INTEGRATED CIRCUIT REALIZING ELECTRICAL INTERFACE

(75) Inventors: Yutaka Terada; Hironori Akamatsu; Satoshi Takahashi; Takashi Hirata; Yoshihide Komatsu, all of Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/828,936

(22) Filed: Apr. 10, 2001

(30) Foreign Application Priority Data

Apr. 13, 2000 (JP) ........................................ 2000-111753

(51) Int. Cl.[7] .............................................. H03M 3/00
(52) U.S. Cl. ....................................................... 341/143
(58) Field of Search ................................ 341/143, 144; 375/244, 283, 330, 331

(56) References Cited

U.S. PATENT DOCUMENTS 4,706,261 A * 11/1987 Torre et al. ................. 341/143

5,948,114 A   9/1999 Klingler

\* cited by examiner

*Primary Examiner*—Brian Young
(74) *Attorney, Agent, or Firm*—McDermott, Will & Emery (57) ABSTRACT

A semiconductor integrated circuit includes receiver, potential sensor and output fixing circuit. The receiver receives a differential signal that has been transmitted through a twisted pair of signal lines, and outputs a signal in accordance with the differential signal. The potential sensor senses a variation in in-phase potential of the differential signal transmitted through the twisted pair. And the output fixing circuit fixes an output of the receiver at a certain value if the variation sensed by the potential sensor is equal to or greater than a predetermined level. In this configuration, once the variation in the in-phase potential of the differential signal has reached the predetermined level, the output of the receiver is fixed at the certain value. Accordingly, even if the receiver operates erroneously due to the in-phase potential variation, the erroneous output of the receiver is not supplied to the next stage like a digital section.

15 Claims, 7 Drawing Sheets

SEMICONDUCTOR INTEGRATED CIRCUIT REALIZING ELECTRICAL INTERFACE

BACKGROUND OF THE INVENTION

The present invention generally relates to a semiconductor integrated circuit and more particularly relates to a semiconductor integrated circuit realizing an electrical interface.

An average rate at which data is transferred between electronic units has been rising day after day to catch up with recent remarkable development of multimedia electronic equipment. The IEEE 1394, which is an international standard for a high performance serial bus, has attracted much attention as a strong candidate for coping with such high-speed applications.

In compliance with the IEEE 1394, two discrete electronic units are coupled together by way of two twisted pair signal lines (which will be herein called a "twisted-pair cable" collectively). In this cable, each twisted pair is driven by a differential signal with a small amplitude of about 200 mV. Each of the electronic units that should be coupled together via the twisted-pair cable includes an LSI realizing an electrical interface (or physical channel interface) for the IEEE 1394 physical layer. So an LSI of this type will be herein called a "PHY chip". The PHY chip includes cludes a circuit for driving the twisted pairs and a circuit for receiving differential signals transmitted through the twisted pairs. Examples of the differential signal receivers include a data receiver and an arbitration comparator. The differential signals, transmitted through the twisted pairs, have a small amplitude, and are amplified by a receiver of any of those types.

Also, according to the IEEE 1394, the in-phase potential of each differential signal on the twisted-pair cable is sometimes controlled in such a manner as to represent some information. This potential control is carried out for a speed signaling or self identification process. In a speed signaling process, for example, a current is shunted from a twisted pair into the ground at one of the units coupled together. As a result, the in-phase potential of the differential signal on the twisted pair drops. Then, the in-phase potential variation is sensed at the other unit. And the transfer rate is determined in accordance with the variation sensed. The IEEE 1394 provides transfer rates at multiple levels, and a transfer rate at the most appropriate level is selected through the speed signaling process.

The receiver included in the PHY chip is normally implemented as operational amplifiers. Accordingly, if the inphase potential of the differential signal changes steeply, then the output of the receiver may have its logical level inverted verted erroneously even though the logic represented by the differential signal remains the same. In that case, the digital section that receives the output of the receiver may also operate erroneously, thus preventing the system from carrying out its transfer operation as intended. An unwanted phenomenon like this often occurs at an arbitration comparator for which an offset has been set.

SUMMARY OF THE INVENTION

It is therefore an object of the present invention to provide a semiconductor integrated circuit that can eliminate the adverse effects possibly caused if its receiver has operated erroneously due to the variation in the in-phase potential of a differential signal.

A semiconductor integrated circuit according to an aspect of the present invention is adapted to realize an electrical interface. The integrated circuit includes receiver, potential sensor and output fixing means. The receiver receives a differential signal that has been transmitted through a twisted pair of signal lines, and outputs a signal in accordance with the differential signal. The potential sensor senses a variation in in-phase potential of the differential signal transmitted through the twisted pair. And the output fixing means fixes an output of the receiver at a certain value if the variation sensed by the potential sensor is equal to or greater than a predetermined level.

In the inventive semiconductor integrated circuit, once a variation in the in-phase potential of a differential signal exceeds a predetermined level, the output of the receiver is fixed at a certain value. Accordingly, even if the receiver operates erroneously due to the in-phase potential variation, the erroneous output of the receiver is not delivered to the next stage (e.g., digital section) that should receive the output of the receiver.

In one embodiment of the present invention, the integrated circuit preferably realizes an electrical interface for the IEEE 1394 physical layer.

In another embodiment of the present invention, the receiver preferably includes an arbitration comparator that receives the differential signal transmitted through the twisted pair and senses three states represented by the differential signal.

In still another embodiment, the potential sensor preferably includes a comparator for comparing the in-phase potential of the differential signal transmitted through the twisted pair to a reference potential.

In yet another embodiment, the certain value is preferably the output of the receiver and associated with a point in time just before the variation sensed by the potential sensor reaches the predetermined level.

In yet another embodiment, the inventive integrated circuit preferably further includes a delay circuit for delaying the output of the receiver.

The integrated circuit according to this embodiment can adjust a time lag between the potential sensor's sensing the in-phase potential variation of the differential signal and the receiver's delivery of its output signal to the digital section. Accordingly, it is possible to avoid an unwanted situation where the erroneous output of the receiver happens to reach the digital section before the potential sensor senses the in-phase potential variation.

In yet another embodiment, on receiving the output of the receiver, the fixing means preferably passes the output of the receiver as it is if the variation sensed by the potential sensor is smaller than the predetermined level. Alternatively, if the variation sensed by the potential sensor is equal to or greater than the predetermined level, the fixing means preferably outputs the certain value.

In this particular embodiment, the fixing means preferably includes a latch circuit. If the variation sensed by the potential sensor is equal to or greater than the predetermined level, the latch circuit preferably holds an output value of the receiver. The output value held is associated with a point in time just before the variation sensed by the potential sensor reaches the predetermined level.

A semiconductor integrated circuit according to another aspect of the present invention is also adapted to realize an electrical interface. The integrated circuit includes receiver, driver and output fixing means. The receiver receives a differential signal that has been transmitted through a twisted pair of signal lines, and outputs a signal in accordance with the differential signal. The driver shunts a current with a predetermined value from the twisted pair into the ground for a prescribed period of time. And the output fixing means fixes an output of the receiver at a certain value during the prescribed period.

When a current is shunted from a twisted pair into the ground, a differential signal, transmitted through the twisted pair, has its in-phase potential dropped. In that case, the receiver might operate erroneously due to the in-phase potential variation. In the inventive integrated circuit, however, the output of the receiver is fixed at a certain value during the period in which a current is shunted from the twisted pair into the ground. Accordingly, even if the receiver operates erroneously due to the in-phase potential variation, the erroneous output of the receiver is not delivered to the next stage (e.g., digital section) that should receive the output of the receiver.

In one embodiment of the present invention, the integrated circuit preferably realizes an electrical interface for the IEEE 1394 physical layer.

In another embodiment of the present invention, the receiver preferably includes an arbitration comparator that receives the differential signal transmitted through the twisted pair and senses three states represented by the differential signal.

In still another embodiment, the certain value is preferably the output of the receiver and associated with a point in time just before the prescribed period begins.

In yet another embodiment, the inventive integrated circuit preferably further includes a delay circuit for delaying the output of the receiver.

In yet another embodiment, on receiving the output of the receiver, the fixing means preferably always delivers the output of the receiver except the prescribed period, during which the fixing means outputs the certain value.

In yet another embodiment, the fixing means preferably includes a latch circuit. During the prescribed period, the latch circuit holds an output value of the receiver. The output value held is associated with a point in time just before the prescribed period begins.

DESCRIPTION OF THE PREFERRED EMBODIMENTS

Hereinafter, embodiments of the present invention will be described with reference to the accompanying drawings, in which each component with the same or like function will be identified by the same reference numeral for the sake of simplicity of description.

Figure 1:
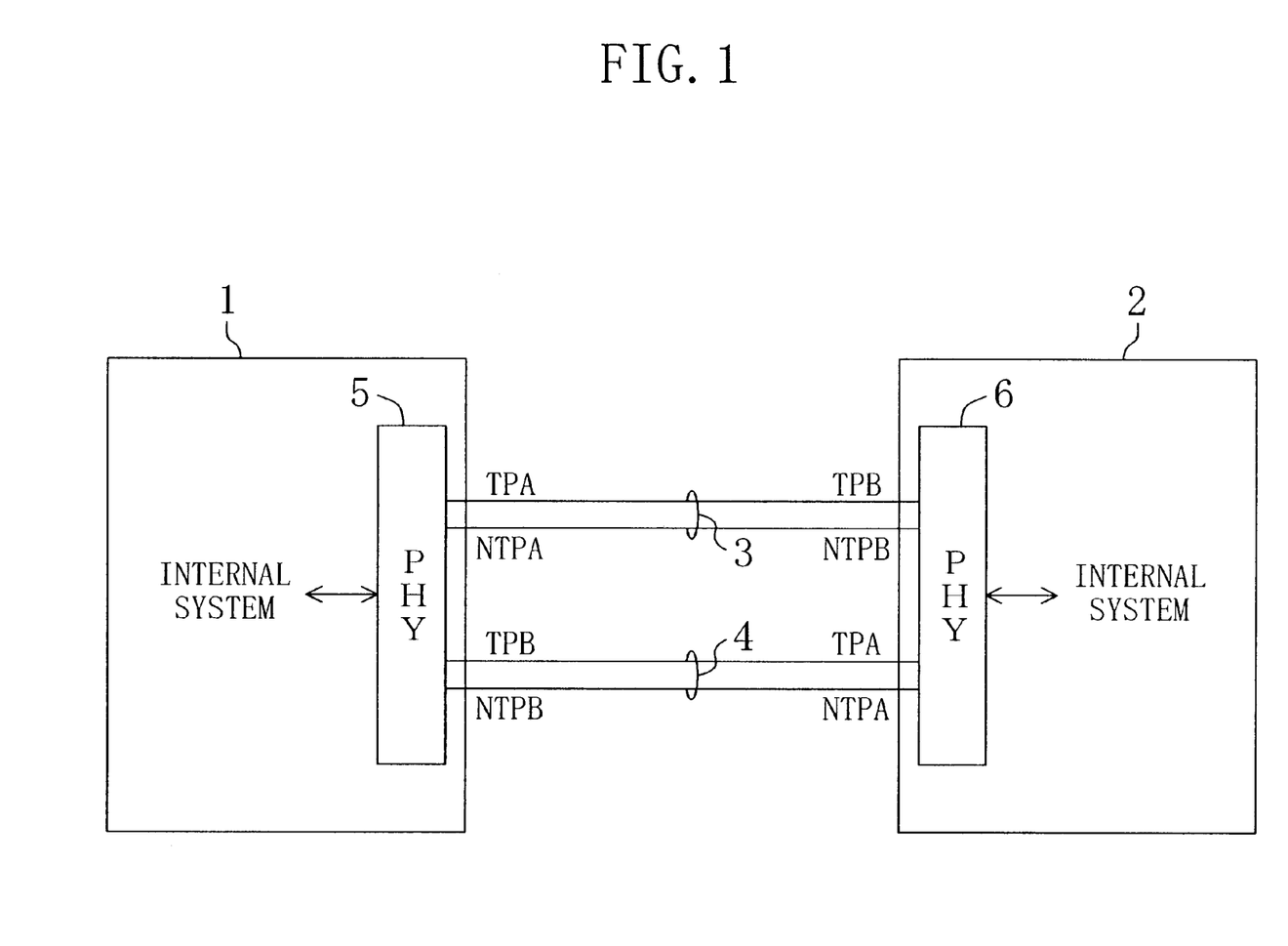
FIG. 1 is a block diagram illustrating a network system constructed using an IEEE 1394 serial bus.

FIG. 1 is a block diagram illustrating a network system constructed using an IEEE 1394 serial bus. In the system shown in FIG. 1, multimedia units 1 and 2 are coupled together by way of two twisted pairs 3 and 4 that form an IEEE 1394 serial bus. As shown in FIG. 1, a differential signal (TPA, NTPA), transmitted from one multimedia unit 1 or 2, is received at the other multimedia unit 2 or 1 as another differential signal (TPB, NTPB). In the same way, the differential signal (TPB, NTPB), transmitted from one multimedia unit 1 or 2, is received at the other multimedia unit 2 or 1 as the differential signal (TPA, NTPA). Each of these multimedia units 1 and 2 includes a PHY chip 5 or 6, which is an LSI realizing an electrical interface for the IEEE 1394 physical layer.

Figure 2:
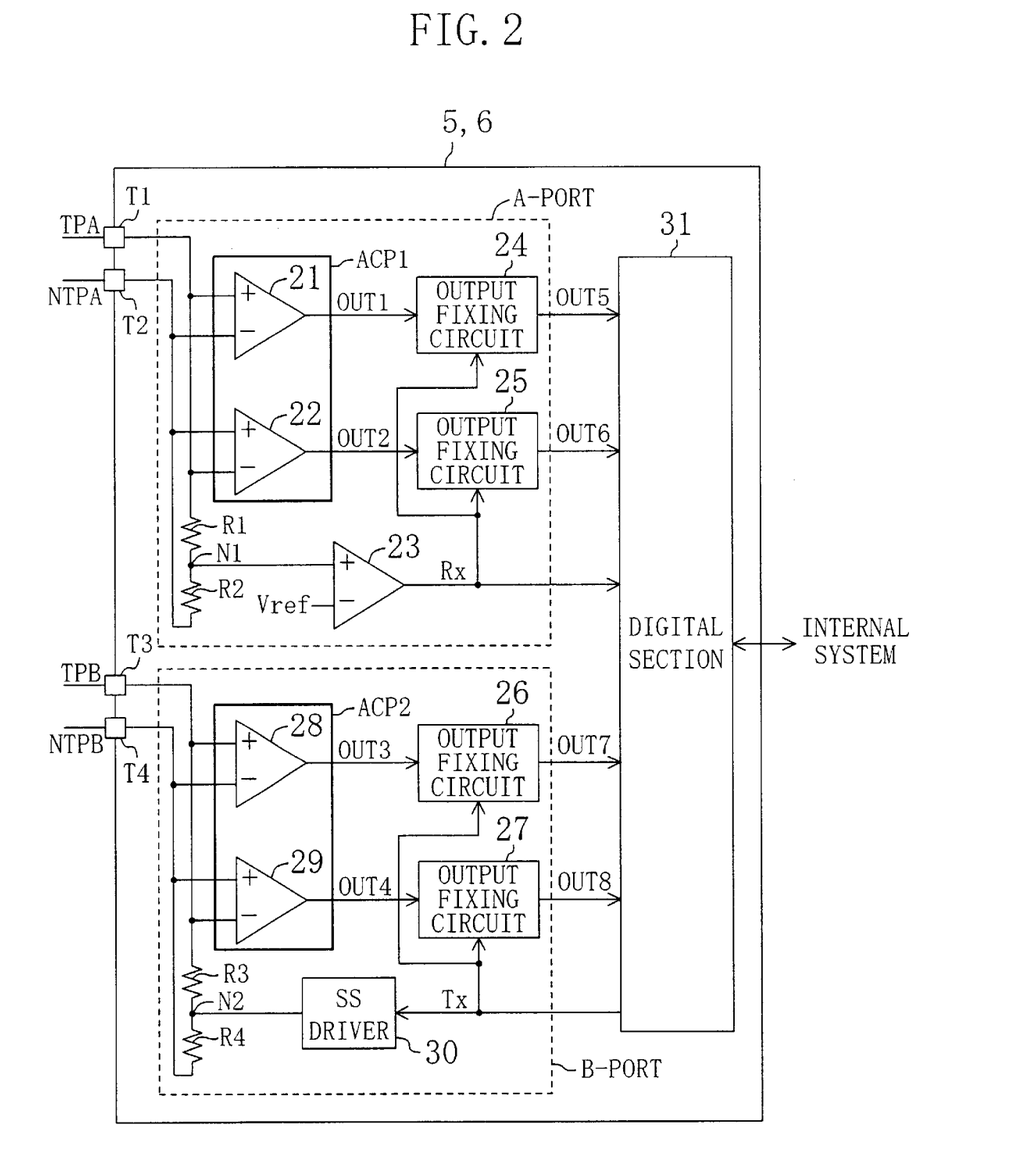
FIG. 2 is a block diagram illustrating an internal configuration for the PHY chips shown in FIG. 1.

FIG. 2 is a block diagram illustrating an internal configuration for the PHY chips 5 and 6 shown in FIG. 1. As shown in FIG. 2, the PHY chip 5 or 6 includes arbitration comparators ACP1 and ACP2, speed signal (SS) receiver 23, SS driver 30, output fixing circuits 24 through 27, resistors R1 through R4, terminals T1 through T4 and digital section 31. The arbitration comparator ACP1, SS receiver 23, output fixing circuits 24 and 25 and resistors R1 and R2 together constitutes an A-port section. On the other hand, the arbitration comparator ACP2, SS driver 30, output fixing circuits 26 and 27 and resistors R3 and R4 together constitutes a B-port section.

Figure 3:
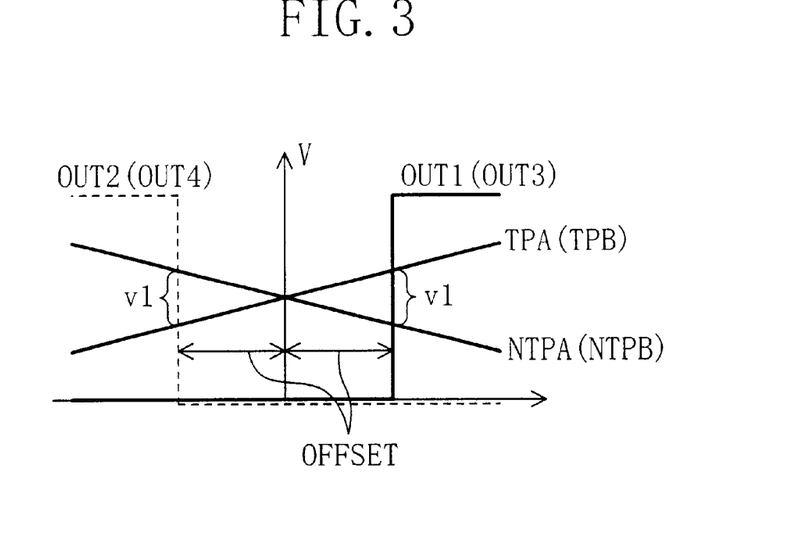
FIG. 3 illustrates a relationship between the input and output of the arbitration comparators shown in FIG. 2.

The arbitration comparator ACP1 includes comparators 21 and 22. The signal TPA, received at the terminal T1, is supplied to the non-inverting input terminal of the comparator 21, while the signal NTPA, received at the terminal T2, is supplied to the inverting input terminal of the comparator 21. The signal NTPA, received at the terminal T2, is supplied to the non-inverting input terminal of the comparator 22, while the signal TPA, received at the terminal T1, is supplied to the inverting input terminal of the comparator 22. An offset is set for each of these comparators 21 and 22. Accordingly, as shown in FIG. 3, if the potential level of the signal TPA is higher than that of the signal NTPA by an offset voltage v1 or more, the comparator 21 outputs a signal OUT1 at logical one level (which will be herein called an "H-level"). Otherwise, the comparator 21 outputs a signal OUT1 at logical zero level (which will be herein called an "L-level"). In the same way, if the potential level of the signal NTPA is higher than that of the signal TPA by the offset voltage v1 or more, the comparator 22 outputs an H-level signal OUT2. Otherwise, the comparator 22 outputs an L-level signal OUT2. That is to say, if the potential level of the signal TPA is higher than that of the signal NTPA by the offset voltage v1 or more, then the outputs OUT1 and OUT2 of the comparators 21 and 22 are at H- and L-levels, respectively. on the other hand, if the potential level of the signal NTPA is higher than that of the signal TPA by the offset voltage v1 or more, then the outputs OUT1 and OUT2 of the comparators 21 and 22 are at L- and H-levels, respectively. Furthermore, if the potential difference between the signals TPA and NTPA is smaller than the offset voltage v1, then the outputs OUT1 and OUT2 of the comparators 21 and 22 are both at L-level. In this manner, the arbitration comparator ACP1 senses the three states (or three values) represented by the differential signal (TPA, NTPA).

The arbitration comparator ACP2 includes comparators 28 and 29. The signal TPB, received at the terminal T3, is supplied to the non-inverting input terminal of the comparator 28, while the signal NTPB, received at the terminal T4, is supplied to the inverting input terminal of the comparator 28. The signal NTPB, received at the terminal T4, is supplied to the non-inverting input terminal of the comparator 29, while the signal TPB, received at the terminal T3, is supplied to the inverting input terminal of the comparator 29. An offset is also set for each of these comparators 28 and 29. Accordingly, as shown in FIG. 3, if the potential level of the signal TPB is higher than that of the signal NTPB by the offset voltage v1 or more, the comparator 28 outputs an H-level signal OUT3. Otherwise, the comparator 28 outputs an L-level signal OUT3. In the same way, if the potential level of the signal NTPB is higher than that of the signal TPB by the offset voltage v1 or more, the comparator 29 outputs an H-level signal OUT4. Otherwise, the comparator 29 outputs an L-level signal OUT4. That is to say, if the potential level of the signal TPB is higher than that of the signal NTPB by the offset voltage v1 or more, then the outputs OUT3 and OUT4 of the comparators 28 and 29 are at H- and L-levels, respectively. On the other hand, if the potential level of the signal NTPB is higher than that of the signal TPB by the offset voltage v1 or more, then the outputs OUT3 and OUT4 of the comparators 28 and 29 are at L- and H-levels, respectively. Furthermore, if the potential difference between the signals TPB and NTPB is smaller than the offset voltage v1, then the outputs OUT3 and OUT4 of the comparators 28 and 29 are both at L-level. In this manner, the arbitration comparator ACP2 senses the three states (or three values) represented by the differential signal (TPB, NTPB).

Figure 4:
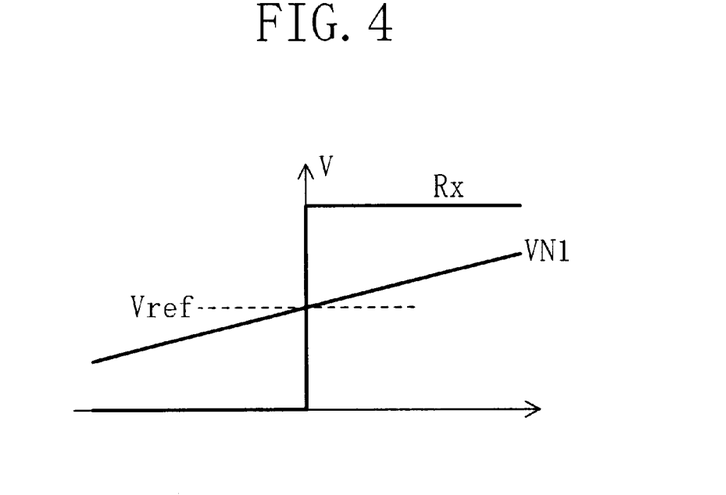
FIG. 4 illustrates a relationship between the input and output of the SS receiver shown in FIG. 2.

A potential at a node N1 is supplied to the non-inverting input terminal of the SS receiver 23, while a reference potential Vref is supplied to the inverting input terminal of the SS receiver 23. The resistors R1 and R2 have the same resistance value. Accordingly, the potential at the node N1 is intermediate between the potential levels of the signals TPA and NTPA, i.e., the in-phase potential of the differential signal (TPA, NTPA). As shown in FIG. 4, if the potential VN1 at the node N1 is higher than the reference potential Vref, then the SS receiver 23 outputs an H-level signal Rx. Alternatively, if the potential VN1 at the node N1 is lower than the reference potential Vref, then the SS receiver 23 outputs an L-level signal Rx.

Responsive to a signal Tx supplied from the digital section 31, the SS driver 30 controls a potential at a node N2. Specifically, if the signal Tx supplied from the digital section 31 is at L-level, the SS driver 30 shunts a current with a predetermined value from the node N2 into the ground. On the other hand, if the signal Tx supplied from the digital section 31 is at H-level, the SS driver 30 shunts no current. The resistors R3 and R4 have the same resistance value. Accordingly, the potential at the node N2 is intermediate between the potential levels of the signals TPB and NTPB, i.e., the in-phase potential of the differential signal (TPB, NTPB).

Figure 5:
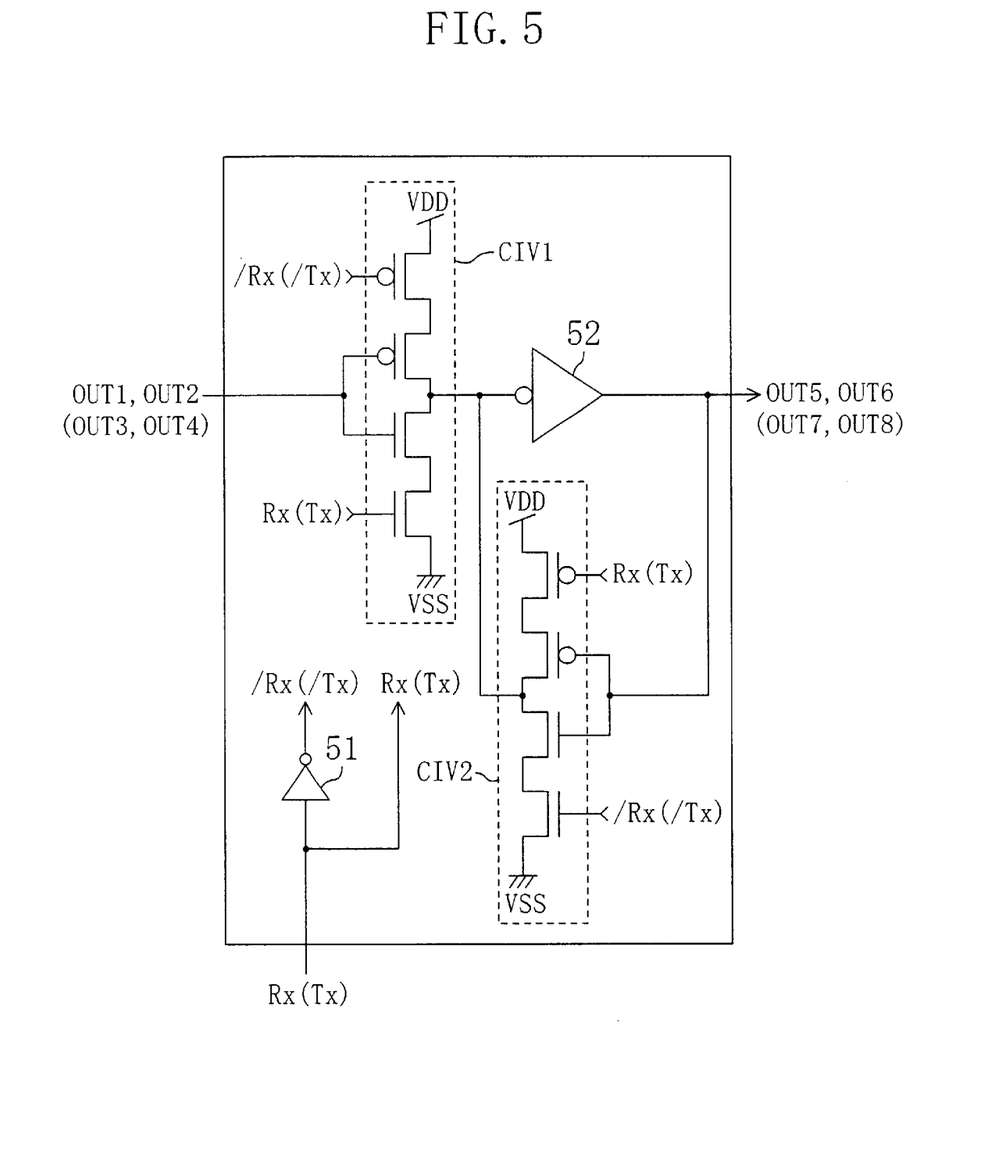
FIG. 5 is a block diagram illustrating an internal configuration for the output fixing circuits shown in FIG. 2.

If the signal Rx or Tx is at H-level, then the output fixing circuits 24 and 25 or 26 and 27 deliver the outputs OUT1 and OUT2 or OUT3 and OUT4 of the associated comparators 21 and 22 or 28 and 29 as OUT5 and OUT6 or OUT7 and OUT8 to the digital section 31. On the other hand, if the signal Rx or Tx is at L-level, then the output fixing circuits 24 and 25 or 26 and 27 output a predetermined value as OUT5 and OUT6 or OUT7 and OUT8 to the digital section 31. FIG. 5 illustrates a specific configuration for the output fixing circuits 24 through 27. As shown in FIG. 5, the output fixing circuit 24, 25, 26 or 27 includes inverters 51 and 52 and clocked inverters CIV1 and CIV2. The inverter 51 inverts the signal Rx or Tx. If the signal Rx or Tx is at H-level, the clocked inverter CIV1 is activated to invert the outputs OUT1 and OUT2 or OUT3 and OUT4 of the comparators 21 and 22 or 28 and 29. The inverter 52 inverts the outputs of the clocked inverters CIV1 and CIV2. The outputs of the inverter 52 will be the outputs OUT5 and OUT6 or OUT7 and OUT8 of the output fixing circuits 24 and 25 or 26 and 27. If the signal Rx or Tx is at L-level, the clocked inverter CIV2 is activated to invert the output of the inverter 52. In the output fixing circuits 24 through 27 with such a configuration, if the signal Rx or Tx is at H-level, then the clocked inverter CIV1 is activated but the clocked inverter CIV2 is deactivated. As a result, the outputs OUT1 and OUT2 or OUT3 and OUT4 of the comparators 21 and 22 or 28 and 29 are delivered as outputs OUT5 and OUT6 or OUT7 and OUT8, respectively. On the other hand, if the signal Rx or Tx is at L-level, then the clocked inverter CIV1 is deactivated but the clocked inverter CIV2 is activated. As a result, the inverter 52 and the clocked inverter CIV2 together form a latch circuit. The latch circuit holds the output of the inverter 52, which is associated with a point in time just before the signal Rx or Tx falls from H- into L-level.

Referring back to FIG. 2, the digital section 31 controls the internal components of the PHY chip 5 or 6 and exchanges data with the internal section of the system.

Although not shown in FIG. 2, the PHY chip 5 or 6 further includes data receiver, data driver and a voltage circuit for determining a reference value for the in-phase potential of the differential signal (TPA, NTPA) or (TPB, NTPB).

Figure 6:
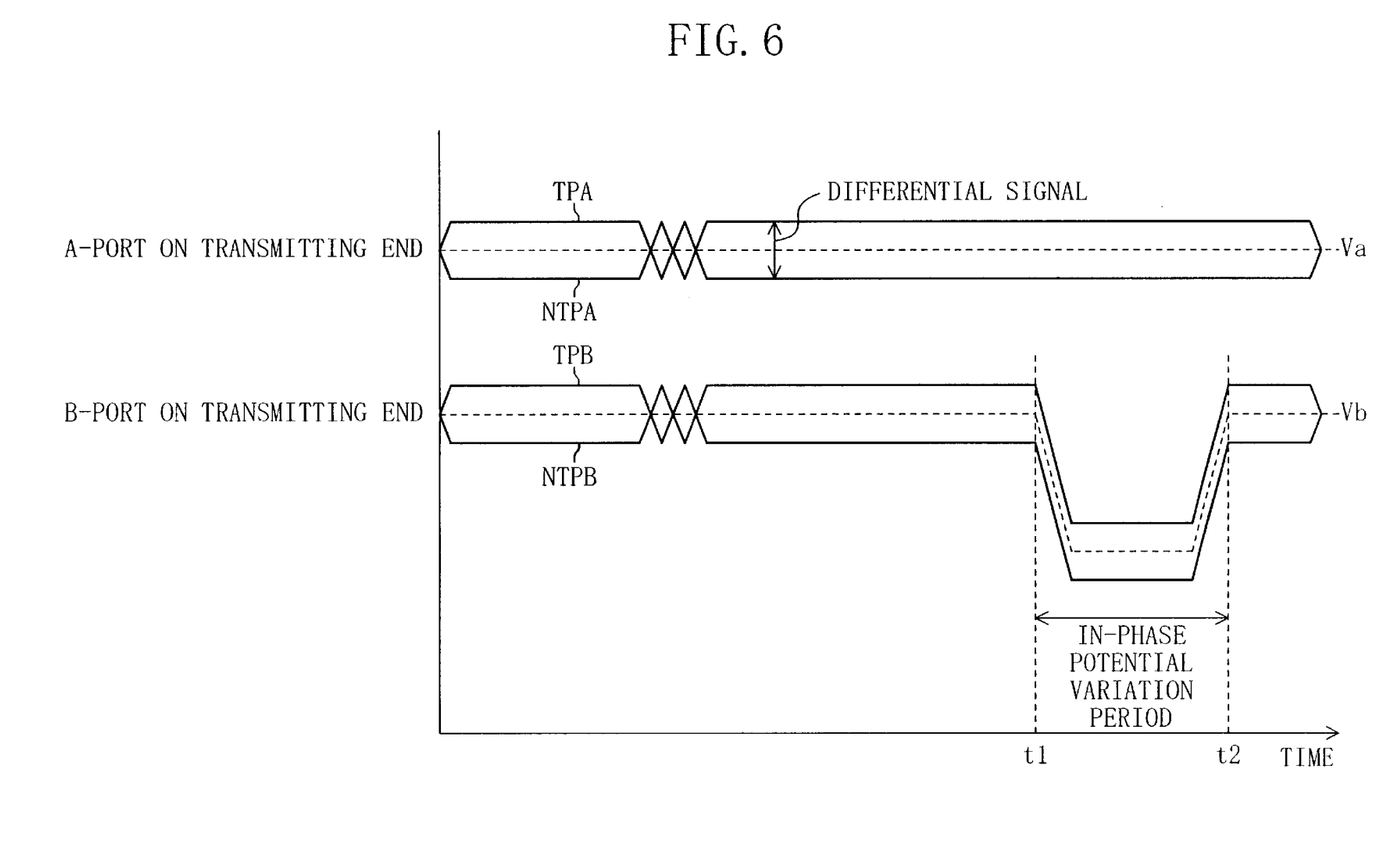
FIG. 6 illustrates how differential signals change their levels during a speed signaling process.

Next, it will be described with reference to FIGS. 2 and 6 how the PHY chip 5 or 6 operates in the network system shown in FIG. 1. FIG. 6 illustrates how differential signals (TPA, NTPA) and (TPB, NTPB), sent out from the transmitting end, change their levels during a normal operation. In the following illustrative example, the multimedia units 1 and 2 are supposed to be located on the transmitting and receiving ends, respectively, for convenience sake.

Up to a time t1, differential signals (TPA, NTPA) and (TPB, NTPB) with in-phase potentials Va and Vb higher than the reference potential Vref are transferred from the A- and B-port sections of the PHY chip 5 on the transmitting end through the twisted pairs 3 and 4, respectively. During this period, the SS receiver 23 of the PHY chip 5 or 6 outputs an H-level signal Rx. In response to the H-level signal Rx, the output fixing circuits 24 and 25 deliver the outputs OUT1 and OUT2 of the arbitration comparator ACP1 as outputs OUT5 and OUT6 to the digital section 31. Also, the digital section 31 of the PHY chip 5 or 6 supplies an H-level signal Tx to the SS driver 30 and output fixing circuits 26 and 27. Since the signal Tx is at H-level, the SS driver 30 shunts no current. Accordingly, the potential at the node N2, or the in-phase potential Vb of the differential signal (TPB, NTPB), does not change. In response to the H-level signal Tx, the output fixing circuits 26 and 27 deliver the outputs OUT3 and OUT4 of the arbitration comparator ACP2 as the outputs OUT7 and OUT8 to the digital section 31.

In a period between the times t1 and t2, a speed signaling process is carried out. According to the IEEE 1394, the logic represented by the differential signal (TPA, NTPA) or (TPB, NTPB) is not supposed to change.

At the time t1, the digital section 31 of the PHY chip 5 on the transmitting end changes the level of the signal Tx from H- into L-level. In response to the L-level signal Tx, the SS driver 30 on the PHY chip 5 shunts a current with a predetermined value from the node N2 into the ground. As a result, the potential at the node N2, or the in-phase potential Vb of the differential signal (TPB, NTPB), drops. The differential signal (TPB, NTPB), sent out from the PHY chip 5 on the transmitting end, will be the differential signal (TPA, NTPA) at the PHY chip 6 on the receiving end. Accordingly, the in-phase potential Va of the differential signal (TPA, NTPA) received at the PHY chip 6, or the potential at the node N1, drops, too. And when the potential at the node N1 on the PHY chip 6 becomes lower than the reference potential Vref, the SS receiver 23 changes the level of the signal Rx from H- into L-level. In response, the clocked inverter CIV1 is deactivated in each of the output fixing circuits 24 and 25 on the PHY chip 6 (see FIG. 5). As a result, the outputs OUT1 and OUT2 of the arbitration comparator ACP1 on the PHY chip 6 are not delivered to the digital section 31 anymore. On the other hand, the clocked inverter CIV2 is activated in each of the output fixing circuits 24 and 25 on the PHY chip 6 (see FIG. 5). As a result, the clocked inverter CIV2 and the inverter 52 form a latch circuit (see also FIG. 5) in each of the circuits 24 and 25. The latch circuits hold the outputs OUT1 and OUT2 of the arbitration comparator ACP1, which are associated with a point in time just before the signal Rx falls from H- into L-level. And the held values are supplied to the digital section 31. Accordingly, even if the outputs OUT1 and OUT2 of the arbitration comparator ACP1 are erroneously inverted due to the variation in the in-phase potential Va of the differential signal (TPA, NTPA) received at the PHY chip 6, the digital section 31 is not affected by the erroneous operation.

In the same way, when the signal Tx falls from H- into L-level, the clocked inverter CIV1 is deactivated in each of the output fixing circuits 26 and 27 on the PHY chip 5. As a result, the outputs OUT3 and OUT4 of the arbitration comparator ACP2 on the PHY chip 5 are not delivered to the digital section 31 anymore. On the other hand, the clocked inverter CIV2 is activated in each of the output fixing circuits 26 and 27 on the PHY chip 5 (see FIG. 5). As a result, the inverter 52 and the clocked inverter CIV2 form a latch circuit in each of the circuits 26 and 27 (see also FIG. 5). The latch circuits hold the outputs OUT3 and OUT4 of the arbitration comparator ACP2, which are associated with a point in time just before the signal Tx falls from H- into L-level. And the held values are supplied to the digital section 31. Accordingly, even if the outputs OUT3 and OUT4 of the arbitration comparator ACP2 are erroneously inverted due to the variation in the in-phase potential Vb of the differential signal (TPB, NTPB) received at the PHY chip 5, the digital section 31 is not affected by the erroneous operation.

When a prescribed period has passed since the time t1, the digital section 31 on the PHY chip 5 changes the level of the signal Tx from L- into H-level. In response, the SS driver 30 on the PHY chip 5 stops shunting the current. As a result, the potential at the node N2, or the in-phase potential Vb of the differential signal (TPB, NTPB), rises. The differential signal (TPB, NTPB), sent out from the PHY chip 5 on the transmitting end, will be the differential signal (TPA, NTPA) at the PHY chip 6 on the receiving end. Accordingly, the in-phase potential va of the differential signal (TPA, NTPA) received at the PHY chip 6, or the potential at the node N1, rises, too. And when the potential at the node N1 on the PHY chip 6 exceeds the reference potential Vref, the SS receiver 23 change the level of the signal Rx from L- into H-level. In response, the clocked inverter CIV1 is activated and the clocked inverter CIV2 is deactivated in each of the output fixing circuits 24 and 25 on the PHY chip 6 (see FIG. 5). As a result, the outputs OUT1 and OUT2 of the arbitration comparator ACP1 on the PHY chip 6 are delivered to the digital section 31 again. On the other hand, when the signal Tx rises from L- into H-level, the clocked inverter CIV1 is also activated and the clocked inverter CIV2 is also deactivated in each of the output fixing circuits 26 and 27 on the PHY chip 5 (see FIG. 5). As a result, the outputs OUT3 and OUT4 of the arbitration comparator ACP2 on the PHY chip 5 are delivered to the digital section 31 again. And then at the time t2, the in-phase potential vb of the differential signal (TPB, NTPB) on the PHY chip 5 recovers its original level that the signal had before the time t1.

As described above, the PHY chip 5 or 6 according to the illustrated embodiment of the present invention includes the output fixing circuits 24 through 27. Accordingly, even if the outputs OUT1 and OUT2 or OUT3 and OUT4 of the arbitration comparator ACP1 or ACP2 are erroneously inverted due to the variation in the in-phase potential Va or Vb of the differential signal (TPA, NTPA) or (TPB, NTPB), the digital section 31 is not affected.

In the illustrated embodiment, each of the output fixing circuits 24 through 27 has a latch-type configuration such as that shown in FIG. 5. Specifically, the output fixing circuit 24, 25, 26 or 27 is so constructed as to hold the output OUT1, OUT2, OUT3 or OUT4 of the arbitration comparator ACP1 or ACP2 just before the signal Rx or Tx falls from H- into L-level. Alternatively, the output fixing circuit 24, 25, 26 or 27 may also be so constructed as to fix the output OUT1, OUT2, OUT3 or OUT4 of the arbitration comparator ACP1 or ACP2 at a certain value compulsorily while the signal Rx or Tx is at L-level. As used herein, the "certain value" means a value that should be output from the arbitration comparator ACP1 or ACP2 unless the arbitration comparator ACP1 or ACP2 operates erroneously. This value is usually determined in advance in accordance with the specification. Accordingly, this value may be set for the output fixing circuit 24, 25, 26 or 27 beforehand and output while the signal Rx or Tx is at L-level.

In the foregoing illustrative embodiment, the output fixing circuits 24 through 27 are implemented by means of hardware. However, the output fixing circuits 24 through 27 are also implementable by means of software. This is because the digital section 31 (e.g., microcomputer or digital signal processor (DSP)) can freely adopt an arbitrary signal processing method using a program. In that alternative embodiment, the output fixing circuits 24 through 27 are omitted and the outputs OUT1 through OUT4 of the arbitration comparators ACP1 and ACP2 are directly supplied to the digital section 31. In response, the digital section 31 performs its processing using the outputs OUT1 through OUT4 of the arbitration comparators ACP1 and ACP2 while the signal Rx or Tx is at H-level. On the other hand, while the signal Rx or Tx is at L-level, the digital section 31 performs its processing using a predefined value, not the outputs OUT1 through OUT4 of the arbitration comparators ACP1 and ACP2. Even in such a software-aided implementation, the effects of the hardware-aided implementation described above are also attainable.

Figure 7:
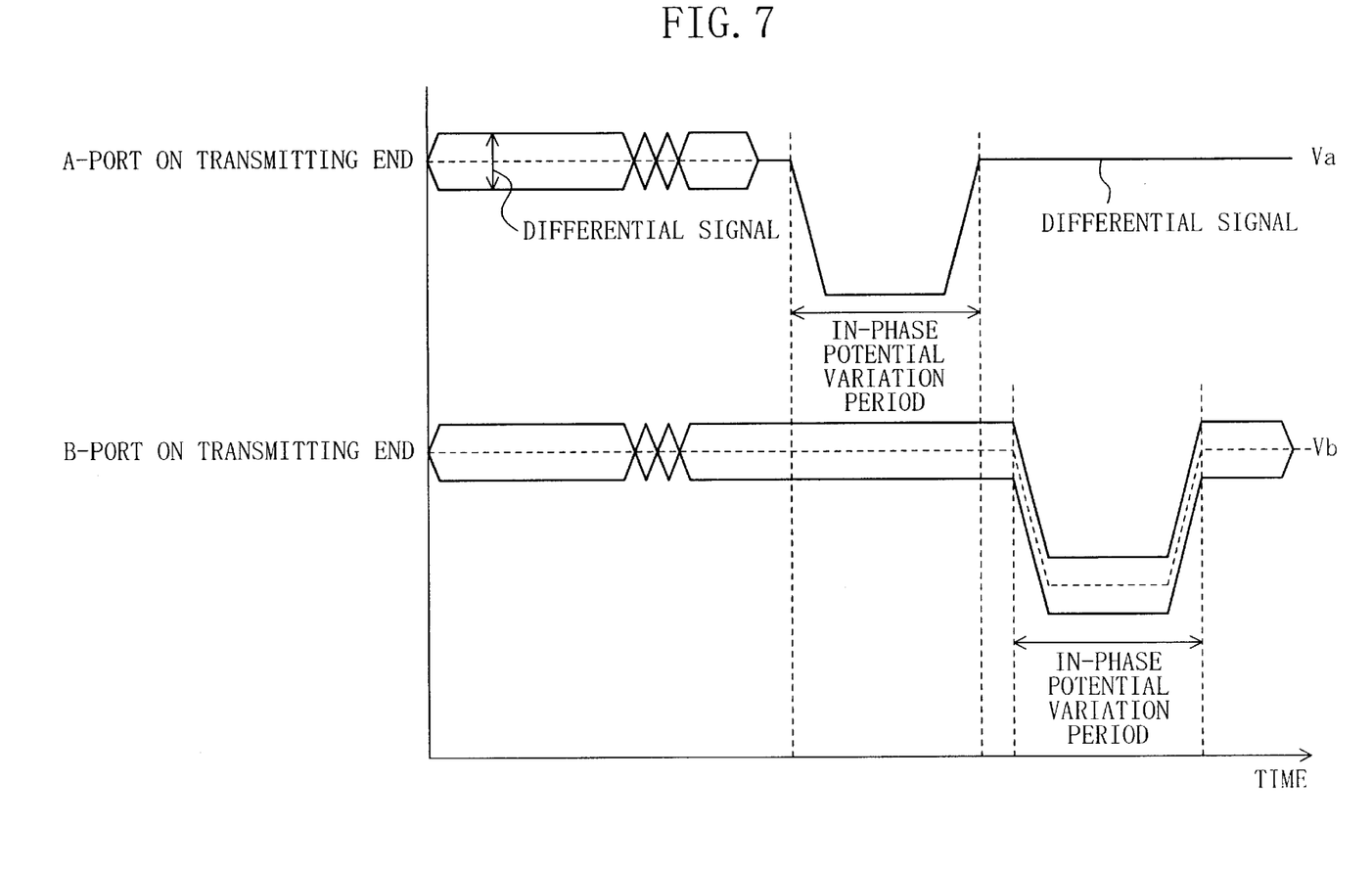
FIG. 7 illustrates how differential signals change their levels during a self identification process.

Also, the foregoing description relates to a period in which a speed signaling process is carried out. However, the same effects are attainable even if the present invention is applied to any other period in which the in-phase potential of the differential signal (TPA, NTPA) or (TPB, NTPB) is variable (e.g., the period shown in FIG. 7 in which a self identification process is performed).

In the foregoing description, the output fixing circuits are applied to a situation where the arbitration comparator ACP1 or ACP2 might operate erroneously due to the variation in the in-phase potential of the differential signal (TPA, NTPA) or (TPB, NTPB) and adversely affect the digital section 31. However, similar output fixing circuits are also effectively applicable to any other circuit (e.g., data receiver) for receiving the differential signal (TPA, NTPA) or (TPB, NTPB) and outputting an associated signal to the digital section 31.

Figure 8:
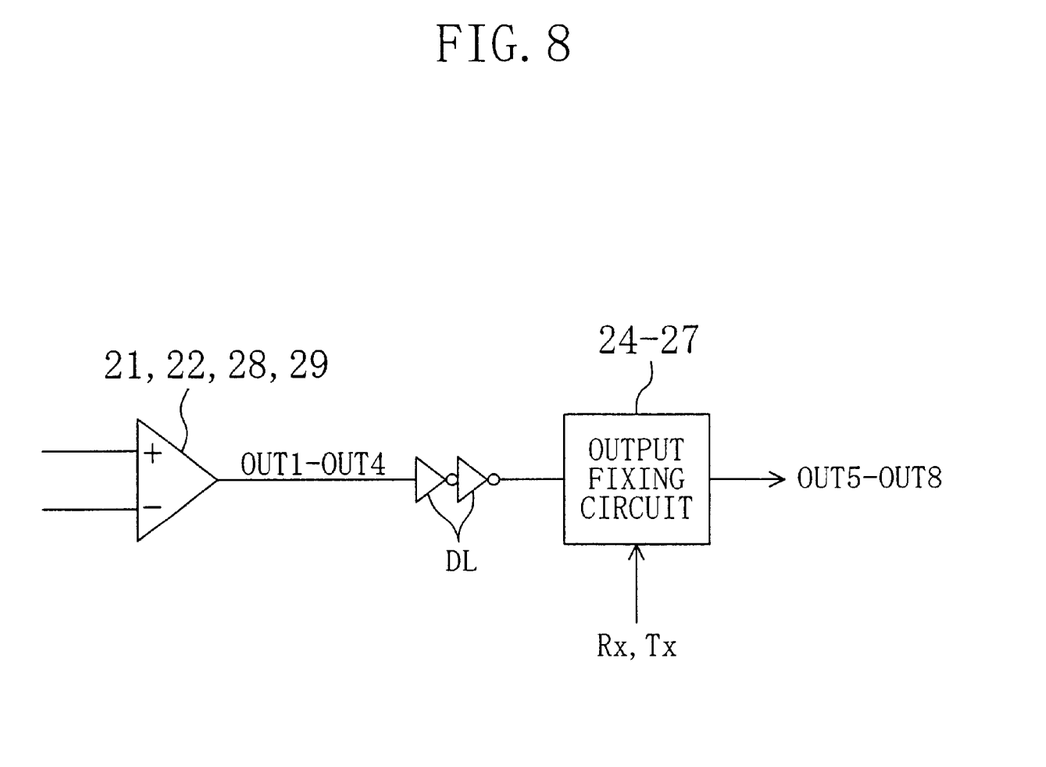
FIG. 8 is a block diagram illustrating an alternative embodiment in which a delay circuit is interposed between the arbitration comparator and output fixing circuit shown in FIG. 2.

Furthermore, in the foregoing embodiment, the outputs OUT1 through OUT4 of the comparators 21, 22, 28 and 29 are directly supplied to the output fixing circuits 24 through 27, respectively. Alternatively, a delay circuit DL may be interposed between the comparator 21, 22, 28 or 29 and the associated output fixing circuit 24, 25, 26 or 27 as shown in FIG. 8. Then, it is possible to avoid an unwanted situation where the erroneous output OUT1, OUT2, OUT3 or OUT4 of the comparator 21, 22, 28 or 29 happens to reach the associated output fixing circuit 24, 25, 26 or 27 earlier than the fall of the signal Rx or Tx from H- into L-level. In the embodiment illustrated in FIG. 8, the delay circuit DL consists of two-stage inverters. However, the number of inverter stages included is not limited thereto, and the delay circuit DL is implementable using any other components.

What is claimed is:

1. A semiconductor integrated circuit realizing an electrical interface, the integrated circuit comprising:
   a receiver, which receives a differential signal that has been transmitted through a twisted pair of signal lines, and outputs a signal in accordance with the differential signal;
   a potential sensor for sensing a variation in in-phase potential of the differential signal transmitted through the twisted pair; and
   means for fixing an output of the receiver at a certain value if the variation sensed by the potential sensor is equal to or greater than a predetermined level.

2. The integrated circuit of claim 1, which realizes an electrical interface for the IEEE 1394 physical layer.

3. The integrated circuit of claim 1, wherein the receiver comprises an arbitration comparator that receives the differential signal transmitted through the twisted pair and senses three states represented by the differential signal.

4. The integrated circuit of claim 1, wherein the potential sensor comprises a comparator for comparing the in-phase potential of the differential signal transmitted through the twisted pair to a reference potential.

5. The integrated circuit of claim 1, wherein the certain value is the output of the receiver and associated with a point in time just before the variation sensed by the potential sensor reaches the predetermined level.

6. The integrated circuit of claim 1, further comprising a delay circuit for delaying the output of the receiver.

7. The integrated circuit of claim 1, wherein on receiving the output of the receiver,
   the fixing means passes the output of the receiver as it is if the variation sensed by the potential sensor is smaller than the predetermined level, or
   outputs the certain value if the variation sensed by the potential sensor is equal to or greater than the predetermined level.

8. The integrated circuit of claim 7, wherein the fixing means comprises a latch circuit, and
   wherein if the variation sensed by the potential sensor is equal to or greater than the predetermined level, the latch circuit holds an output value of the receiver, the output value held being associated with a point in time just before the variation sensed by the potential sensor reaches the predetermined level.

9. A semiconductor integrated circuit realizing an electrical interface, the integrated circuit comprising:
   a receiver, which receives a differential signal that has been transmitted through a twisted pair of signal lines, and outputs a signal in accordance with the differential signal;
   a driver for shunting a current with a predetermined value from the twisted pair into the ground for a prescribed period of time; and
   means for fixing an output of the receiver at a certain value during the prescribed period.

10. The integrated circuit of claim 9, which realizes an electrical interface for the IEEE 1394 physical layer.

11. The integrated circuit of claim 9, wherein the receiver comprises an arbitration comparator that receives the differential signal transmitted through the twisted pair and senses three states represented by the differential signal.

12. The integrated circuit of claim 9, wherein the certain value is the output of the receiver and associated with a point in time just before the prescribed period begins.

13. The integrated circuit of claim 9, further comprising a delay circuit for delaying the output of the receiver.

14. The integrated circuit of claim 9, wherein on receiving the output of the receiver,
   the fixing means always delivers the output of the receiver except the prescribed period, during which the fixing means outputs the certain value.

15. The integrated circuit of claim 14, wherein the fixing means comprises a latch circuit for holding an output value of the receiver during the prescribed period, the output value held being associated with a point in time just before the prescribed period begins.

* * * * *